US012711061B2

(12) United States Patent
Malshe et al.

(10) Patent No.: US 12,711,061 B2
(45) Date of Patent: Aug. 18, 2026

(54) MEMORY MANAGEMENT AMONG MULTIPLE ERASE BLOCKS COUPLED TO A SAME STRING

(71) Applicant: Micron Technology, Inc., Boise, ID (US)

(72) Inventors: Ashutosh Malshe, Fremont, CA (US); Kishore K. Muchherla, San Jose, CA (US); Xiangang Luo, Fremont, CA (US); Daniel J. Hubbard, Boise, ID (US); Akira Goda, Setagaya (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/965,377

(22) Filed: Dec. 2, 2024

(65) Prior Publication Data

US 2025/0181501 A1 Jun. 5, 2025

Related U.S. Application Data

(60) Provisional application No. 63/605,763, filed on Dec. 4, 2023.

(51) Int. Cl.
*G06F 12/02* (2006.01)

(52) U.S. Cl.
CPC .. *G06F 12/0246* (2013.01); *G06F 2212/7205* (2013.01)

(58) Field of Classification Search
CPC .................... G06F 12/0246; G06F 2212/7205
See application file for complete search history.

(56) References Cited

U.S. PATENT DOCUMENTS

| | | | | |
|---|---|---|---|---|
| 7,177,977 | B2 | 2/2007 | Chen | |
| 8,542,530 | B2 | 9/2013 | Hemink | |
| 9,786,375 | B2 | 10/2017 | Goda | |
| 10,229,740 | B2 | 3/2019 | Cai | |
| 2005/0149686 | A1* | 7/2005 | Bacon | G06F 12/0269 711/170 |
| 2007/0247910 | A1* | 10/2007 | Nazarian | G11C 16/0483 365/185.11 |
| 2011/0055458 | A1* | 3/2011 | Kuehne | G06F 12/0246 711/E12.001 |
| 2011/0194357 | A1* | 8/2011 | Han | G11C 16/16 365/185.29 |
| 2014/0310499 | A1* | 10/2014 | Sundararaman | G06F 12/0269 711/203 |
| 2017/0040061 | A1* | 2/2017 | Yeh | G11C 16/0483 |
| 2017/0286286 | A1* | 10/2017 | Szubbocsev | G06F 12/0246 |
| 2018/0088805 | A1* | 3/2018 | Kanno | G06F 12/0246 |

(Continued)

*Primary Examiner* — Eric T Loonan
(74) *Attorney, Agent, or Firm* — Brooks, Cameron & Huebsch, PLLC

(57) ABSTRACT

An apparatus can comprise a memory array comprising a plurality of physical blocks of strings of memory cells, wherein each physical block of the plurality of physical blocks comprises multiple erase blocks that are independently erasable, and wherein the multiple erase blocks within a particular physical block comprise memory cells coupled to a same string corresponding to the particular physical block. A controller can be coupled to the memory array and configured to: perform a memory management operation at an erase block level; and switch to perform the memory management operation at a physical block level.

8 Claims, 7 Drawing Sheets

(56) References Cited

U.S. PATENT DOCUMENTS

| | | | | |
|---|---|---|---|---|
| 2018/0108404 | A1* | 4/2018 | Miura | G11C 13/0097 |
| 2023/0041476 | A1* | 2/2023 | Yang | G11C 16/3495 |
| 2023/0121846 | A1* | 4/2023 | Wang | G11C 16/14<br>365/185.29 |
| 2024/0177788 | A1* | 5/2024 | Song | G11C 16/3495 |

* cited by examiner

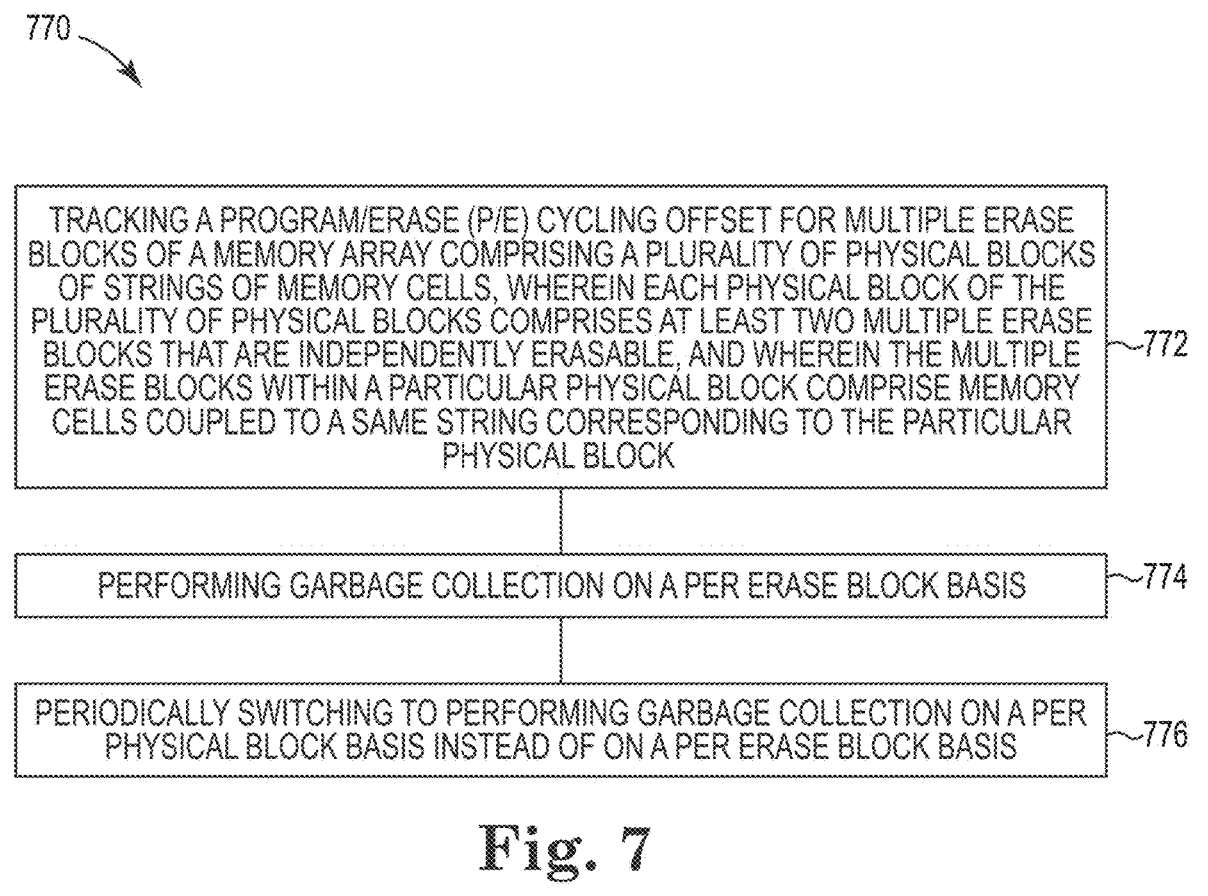

770

TRACKING A PROGRAM/ERASE (P/E) CYCLING OFFSET FOR MULTIPLE ERASE BLOCKS OF A MEMORY ARRAY COMPRISING A PLURALITY OF PHYSICAL BLOCKS OF STRINGS OF MEMORY CELLS, WHEREIN EACH PHYSICAL BLOCK OF THE PLURALITY OF PHYSICAL BLOCKS COMPRISES AT LEAST TWO MULTIPLE ERASE BLOCKS THAT ARE INDEPENDENTLY ERASABLE, AND WHEREIN THE MULTIPLE ERASE BLOCKS WITHIN A PARTICULAR PHYSICAL BLOCK COMPRISE MEMORY CELLS COUPLED TO A SAME STRING CORRESPONDING TO THE PARTICULAR PHYSICAL BLOCK ~772

PERFORMING GARBAGE COLLECTION ON A PER ERASE BLOCK BASIS ~774

PERIODICALLY SWITCHING TO PERFORMING GARBAGE COLLECTION ON A PER PHYSICAL BLOCK BASIS INSTEAD OF ON A PER ERASE BLOCK BASIS ~776

Fig. 7

MEMORY MANAGEMENT AMONG MULTIPLE ERASE BLOCKS COUPLED TO A SAME STRING

PRIORITY INFORMATION

This application claims the benefit of U.S. Provisional Application No. 63/605,763, filed on Dec. 4, 2023, the contents of which are incorporated herein by reference.

TECHNICAL FIELD

Embodiments of the disclosure relate generally to memory systems, and more specifically, relate to apparatuses and methods for memory management among multiple erase blocks coupled to a same string.

BACKGROUND

A memory system can include a memory sub-system, which can be a storage device, a memory module, or a hybrid of a storage device and a memory module. Examples of a storage device include a solid-state drive (SSD), a Universal Flash Storage (UFS) drive, a secure digital (SD) card, an embedded Multiple Media Card (eMMC), and a hard disk drive (HDD). Examples of memory modules include a dual in-line memory module (DIMM) and various types of non-volatile dual in-line memory modules (NVDIMMs). Memory systems include one or more memory components (e.g., memory devices) that store data. The memory components can be, for example, non-volatile memory components (e.g., NAND flash memory devices) and volatile memory components (e.g., DRAM devices). In general, a host system can utilize a memory system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 7 is a flow diagram illustrating memory management among multiple erase blocks coupled to a same string in accordance with various embodiments of the present disclosure.

DETAILED DESCRIPTION

Figure 1:
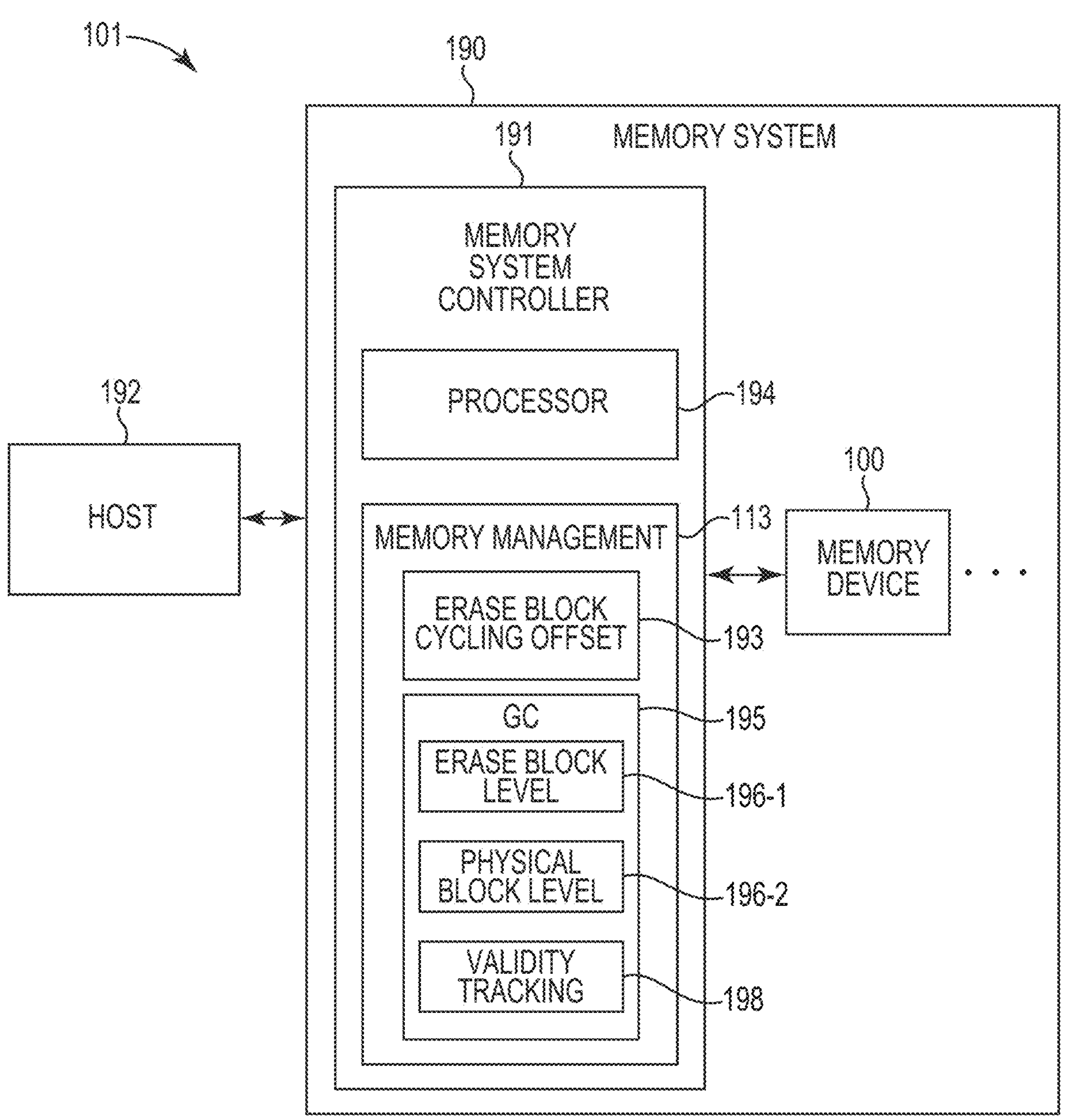
FIG. 1 illustrates an example computing system having a memory system for performing memory management among multiple erase blocks coupled to a same string in accordance with various embodiments of the present disclosure.

Aspects of the present disclosure are directed to apparatuses and methods for memory management among multiple erase blocks coupled to a same string. Various types of memory, such as NAND flash memory, include a memory array of many memory cells that can be arranged in row and column fashion and grouped in physical blocks. The cells can include a charge storage node such as a floating gate or charge-trap layer which allows the cells to be programmed to store one more bits by adjusting the charge stored on the storage node. Generally, an erase operation (e.g., a "block erase") is performed to erase all of the cells of a physical block together as a group.

Three-dimensional (3D) flash memory (e.g., a 3D NAND memory array) can include multiple strings of memory cells with each string comprising multiple series-coupled (e.g., source to drain) memory cells in a vertical direction, with the memory cells of a string sharing a common channel region. Each memory cell of a string can correspond to a different tier of the memory array, with a group of strings sharing multiple access lines, which may be referred to as word lines (WLs). Each access line can be coupled to respective memory cells of each string in the group of strings (e.g., the memory cells of a particular tier of the memory array). Groups of strings are coupled to respective sense lines (which may be referred to as data lines or bit lines (BLs)) of a group of sense lines. The cells of the strings can be positioned between a drain-side select gate (referred to as a select gate drain (SGD)) and a source-side select gate (referred to as select gate source (SGS)) used to control access to the strings. A 3D NAND array can be a replacement gate (RG) NAND array or a floating gate NAND array, for example.

A 3D memory array can comprise multiple physical blocks each comprising a plurality of memory pages (e.g., physical pages of cells than can store one or more logical pages of data). In various previous approaches, a block of memory cells corresponds to a smallest group of memory cells that can be erased. For example, in prior approaches it is not possible to erase some of the memory cells (e.g., a first sub-block) of a physical block while maintaining data in other memory cells (e.g., a second sub-block) of the physical block.

Some prior approaches that may provide an ability to erase some memory cells (e.g., a sub-block) of a physical block while maintaining data in other memory cells (e.g., another sub-block) of the physical block can suffer various drawbacks. For example, independently operating groups of cells within a physical block can result in stress and various disturb (e.g., program disturb, read disturb, program verify disturb, erase disturb, etc.) to the other groups of cells within the physical block. Such disturb can result in threshold voltage (Vt) shifts of the victim cells, which can lead to increased bit error rates (BERs) and/or data loss, for example. Various disturb effects can be increased in situations in which one group of cells within a physical block stores data that is frequently overwritten (e.g., "hot" data) while another group of cells sharing a string with the first group of cells stores data that that is not frequently overwritten (e.g., "cold" data that is stored for longer terms and/or infrequently updated such as operating system files or large media files). Some systems manage (e.g., reduce) disturb effects by refreshing the victim groups (e.g., periodically). However, such refreshes have drawbacks such as reduced system performance and/or increased write amplification effects, which can reduce the useful life of the system. As an example, system performance can be affected (e.g., reduced) due to increased bus collisions since multiple separate erase commands are used to erase respective portions of a physical block that would otherwise have been erased via a single erase command. That is, quality of service (QOS) can be reduced due to increased bus collisions resulting from an increased quantity of erase operations that occur due to erasure of portions of physical blocks as opposed to entire physical blocks. Additionally, erasing portions of a physical block as opposed to an entire physical block leads to a shortened erase suspend window since it takes longer to erase an entire physical block, which can adversely affect system QoS.

Various embodiments of the present disclosure address the above and other deficiencies by providing improved apparatuses and methods for memory management among multiple erase blocks coupled to a same string. As used herein, an "erase block" refers to a group of cells that are configured to be erased together as a group and that share a same string as one or more additional groups of cells (e.g., one or more additional erase blocks). An erase block may also be referred to as a "deck." As such, a physical block of cells can include multiple decks each capable of undergoing program/erase (P/E) cycling irrespective of the other decks. Decks experiencing disturb due to operations (e.g., read operations, program verify operations) performed on one or more other decks sharing a string are referred to as "victim" decks, with the one or more other decks being referred to as "aggressor" decks.

As previously noted, managing a memory array at an erase block level as opposed to at a physical block level can present challenges in terms of write amplification and/or QoS, for example, which can be affected by P/E cycling, wear leveling, and/or garbage collection policies implemented by the system. Garbage collection involves moving valid data (e.g., pages) of a block (e.g., a physical block or an erase block), referred to as the source block, to a different block, referred to as destination block, in order to erase the source block and add it to a pool of available free blocks. Garbage collection is often performed as a background operation (e.g., by a system controller) such that it is transparent to the host. Various systems use a "greedy" garbage collection policy in which blocks having the fewest valid pages are selected as source blocks in order to reduce/minimize write amplification impact. Performing garbage collection at an erase block level can provide reduced write amplification as compared to performing garbage collection at the physical block level; however, garbage collection at the erase block level can adversely affect QoS and system performance due to increased command collisions and a reduced erase suspend window, as mentioned above.

Various embodiments of the present disclosure can implement a memory management policy that can include switching between performing garbage collection at an erase block level and at a physical block level. The memory management policy can include balancing P/E cycling offset management and garbage collection management. In various embodiments, the frequency at which block based garbage collection is used (in favor of erase block based garbage collection) can be fixed or variable and can be selectable (e.g., tunable) in order to achieve a desired QoS and write amplification benefit. As an example, how often block based garbage collection is invoked can be a function of an erase block P/E offset and/or of the amount (e.g., percentage) of block level valid data, for example.

In some embodiments, the block level garbage collection can be invoked opportunistically. For example, the block based garbage collection can be invoked as a function of workload (e.g., in order for sequential data to be written to erase blocks within a same physical block). Performing garbage collection on a per block basis as opposed to at a per erase block basis has the benefit of resetting, via a single erase operation, the P/E cycling offset between constituent erase blocks of (e.g., within) a particular physical block, which can alleviate the impact of multiple erase operations per physical block thereby improving latency as the number of collisions are reduced. The above and other benefits are described further herein.

FIG. 1 illustrates an example computing system 101 having a memory system 190 for memory management among multiple erase blocks coupled to a same string in accordance with various embodiments of the present disclosure. As shown in FIG. 1, the memory system 190 includes a system controller 191 and a number of memory devices 100, which can be memory devices such as device 200 described in FIG. 2 (e.g., memory devices comprising memory arrays having multiple erase blocks coupled to common strings).

In some embodiments, the memory system 190 is a storage system. An example of a storage system is a solid-state drive (SSD). In some embodiments, the memory system 190 is a hybrid memory/storage sub-system. In general, the computing environment shown in FIG. 1 can include a host system 192 that uses the memory system 190. For example, the host system 192 can write data to the memory system 190 and read data from the memory system 190.

The memory system controller 191 (hereinafter referred to as "controller") can communicate with the memory devices 100 to perform operations such as reading data, writing data, or erasing data at the memory devices 100 and other such operations. The controller 191 can include hardware such as one or more integrated circuits and/or discrete components, a buffer memory, or a combination thereof. The controller 191 can include a microcontroller, special purpose logic circuitry (e.g., a field programmable gate array (FPGA), an application specific integrated circuit (ASIC), etc.), or other suitable processing circuitry. The controller 191 can include a processing device (e.g., processor 194) configured to execute instructions stored in local memory (not shown).

In general, the controller 191 can receive commands or operations from the host system 192 and can convert the commands or operations into instructions or appropriate commands to achieve the desired access to the memory devices 100. The controller 191 can be responsible for other operations such as wear leveling operations, garbage collection operations, error detection and error-correcting code (ECC) operations, encryption operations, caching operations, and address translations between a logical block address and a physical block address that are associated with the memory devices 100.

In this example, the controller 191 includes a memory management component 113. The memory management component 113 can be associated with a flash translation layer (FTL), for example. The memory management component 113 includes an erase block cycling offset component 193 that can be responsible for, among other things, tracking P/E cycle count offsets associated with physical blocks of the memory devices 100. As described further herein, erase blocks within a particular physical block can experience different quantities of P/E cycles, which can result in accumulation of disturb effects (e.g., between hot and cold erase blocks). The component 193 can track the erase block P/E cycle counts and can refresh or otherwise move (e.g., via folding) victim erase blocks responsive to a P/E cycling offset reaching a threshold value. As one example, the P/E cycling offset may be 100, such that a particular erase block (e.g., victim) is refreshed responsive to another erase block (e.g., aggressor) in the same physical block having undergone 100 P/E cycles since the particular erase block was last cycled (e.g., programmed or erased).

The memory management component 113 also includes a garbage collection (GC) component 195 that can be responsible for executing a garbage collection policy in accordance with embodiments described herein. The GC component 195 includes an erase block level component 196-1 configured to perform garbage collection on a per erase block basis, and a physical block level component 196-2 configured to perform garbage collection on a per physical block basis (e.g., the multiple erase blocks within a physical block are garbage collected together as a group). The GC component 195 also includes a validity tracking component 198 configured to track the amount of valid data per erase block and per physical block for the memory devices 100. The determined amount (e.g., percentage) of valid data per erase block (or physical block) can be used in association with executing a greedy garbage collection policy, for example. However, embodiments are not so limited.

In a number of embodiments, the controller 191 can be configured to perform garbage collection on a per erase block basis and can periodically switch to perform garbage collection on a per physical block basis instead of on a per erase block basis. The frequency at which the controller 191 periodically switches to perform garbage collection on the per physical block basis can be fixed or variable. In various embodiments, the frequency at which the controller 191 switches to performing garbage collection at a physical block level is a function of the P/E cycling offset. In some embodiments, the frequency at which the controller 191 switches to performing garbage collection at a physical block level is a function of the P/E cycling offset and of the physical block level determined amount of valid data (e.g., percentage of valid data per physical block).

The controller 191 can be configured to switch between performing the garbage collection operation at the erase block level and at the physical block level based on a target latency associated with execution of commands received from the host 192. The controller 191 can also be configured to switch between performing the garbage collection operation at the erase block level and at the physical block level based on a workload characteristic. For example, it can be beneficial to switch from erase block level GC to physical block level GC in instances in which sequential data is being written to the memory devices 100 so that the sequential data can be written to erase blocks within a same physical block as opposed to being written to multiple erase blocks across different physical blocks.

The host system 192 can be a computing device such as a desktop computer, laptop computer, network server, mobile device, or other such computing device that includes a memory and a processing device. The host system 192 can be coupled to the memory system 190 via a physical host interface (not shown in FIG. 1). As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, a universal flash storage (UFS) interface, a universal serial bus (USB) interface, Fibre Channel, Serial Attached SCSI (SAS), etc. The physical host interface can be used to transmit data between the host system 192 and the memory system 190. The host system 192 can further utilize an NVM Express (NVMe) interface to access the memory devices 100 when the memory system 190 is coupled with the host system 192 by the PCIe interface. The physical host interface can provide an interface for passing control, address, data, and other signals between the memory system 190 and the host system 192.

While the example memory system 190 in FIG. 1 has been illustrated as including the controller 191, in another embodiment of the present disclosure, a memory system 190 may not include a controller 191, and can instead rely upon external control (e.g., provided by a processor or controller separate from the memory system 190, such as by host 192 communicating directly with the memory devices 100).

Although the memory system 190 is shown as physically separate from the host 192, in a number of embodiments the memory system 190 can be embedded within the host 192. Alternatively, the memory system 190 can be removable from the host 192.

Figure 2:
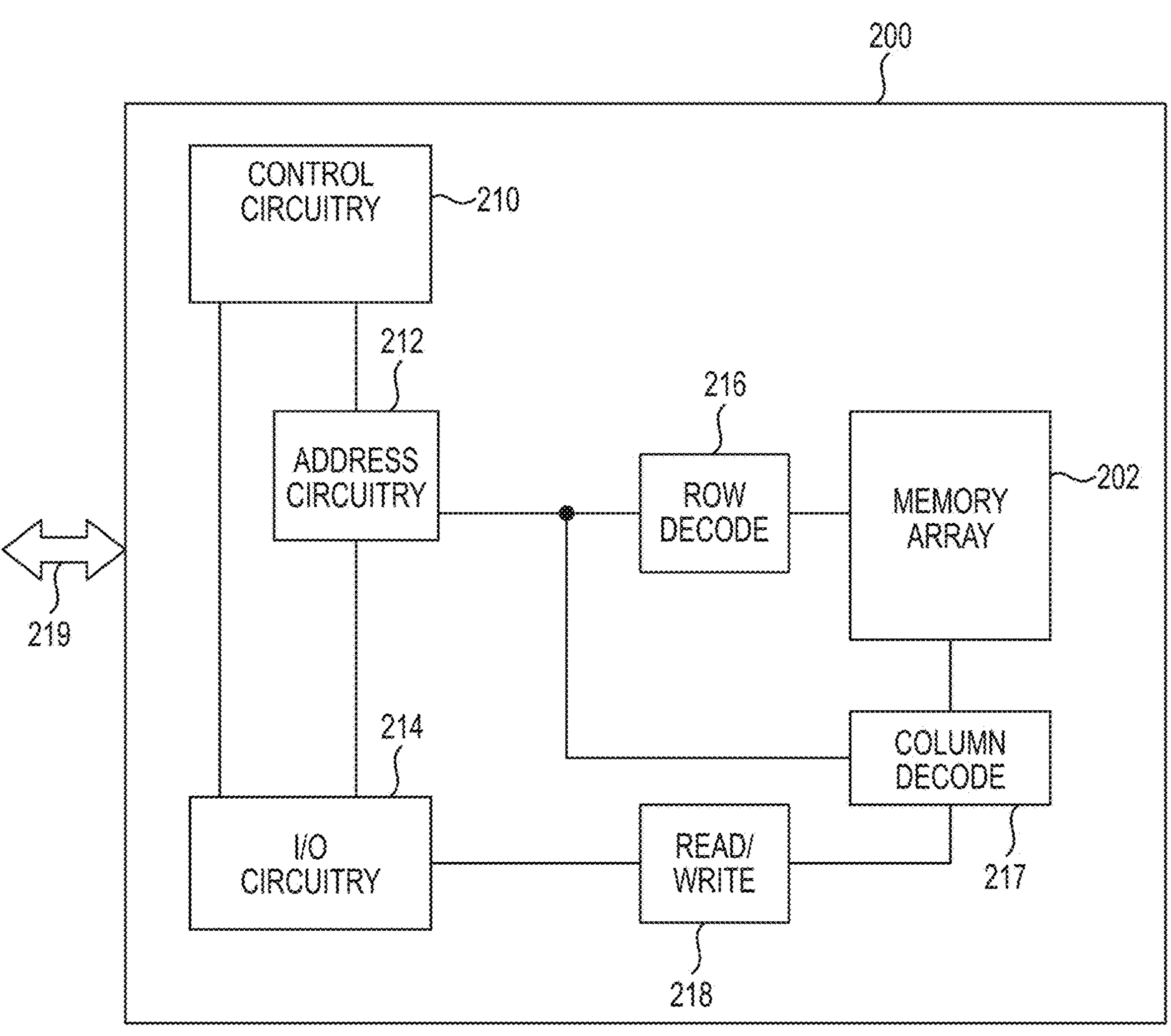
FIG. 2 illustrates an example portion of a memory system including a memory device having an array in accordance with various embodiments of the present disclosure.

FIG. 2 illustrates an example portion of a memory system including a memory device 200 having and array 202 in accordance with various embodiments of the present disclosure. The memory array 202 can be a 3D NAND array such as described further in association with FIG. 3, for example. The array can comprise single level cells (SLCs) storing 1 bit per cell, multilevel cells (MLCs) storing 2 bits per cell, triple level cells (TLCs) storing three bits per cell, or quad level cells (QLCs) storing 4 bits per cell, for example. Embodiments are not limited to a particular type of memory cell. The memory device 100 can be part of a memory system such as memory system 190 described in FIG. 1.

The memory device 200 includes control circuitry 210, address circuitry 212, and input/output (I/O) circuitry 214 used to communicate with an external device via an interface 219. The interface 219 can include, for example, a bus used to transmit data, address, and control signals, among other signals between the memory device 200 and an external host device, which can include a controller (e.g., system controller such as controller 191 shown in FIG. 1), host processor (e.g., host 192 shown in in FIG. 1), etc., that is capable of accessing the memory array 202. As an example, the memory device 200 can be within a system such as an SSD with the interface 219 coupling the memory device 200 to a system controller. The interface 219 can include a combined address, control, and data bus or separate busses depending on the particular physical interface and corresponding protocol. The interface 219 can be an Open NAND Flash Interface (ONFI) interface or a Non-Volatile Memory Express (NVMe) interface, a serial attached SCSI (SAS), a serial AT attachment (SATA) interface, a peripheral component interconnect express (PCIe) interface, a universal flash storage (UFS) interface, an I2C/I3C interface, and/or other suitable interface (e.g., a parallel interface); however, embodiments are not limited to a particular type of interface or protocol.

The control circuitry 210 can decode signals (e.g., commands) received via interface 219 and executed to control operations performed on the memory array 202. The operations can include data programming operations, which may be referred to as write operations, data read operations, which may be referred to as sensing operations (and can include program verify operations), data erase operations, etc. The control circuitry 210 can cause various groups of memory cells (e.g., pages, blocks, erase blocks, etc.) to be selected or deselected in association with performing memory operations on the array 202. The control circuitry 210 can comprise a state machine, a sequencer, and/or some other type of control circuitry, which may be implemented in the form of hardware, firmware, or software, or any combination thereof.

The I/O circuitry 214 is used for bi-directional communication of data between the memory array 202 and the external device via interface 219. The address circuitry 212, which can include a register, can latch address signals received thereto, and the address signals can be decoded by a row decoder 216 and a column decoder 217 to access the memory array 202. The memory device 200 includes read/write circuitry 218 used to read data from and write data to the memory array 202. As an example, the read/write circuitry can include various latch circuitry, drivers, sense amplifiers, buffers, etc. Data can be read from the memory array 202 by sensing voltage and/or current changes on bit lines of the memory array 202.

Figure 3:
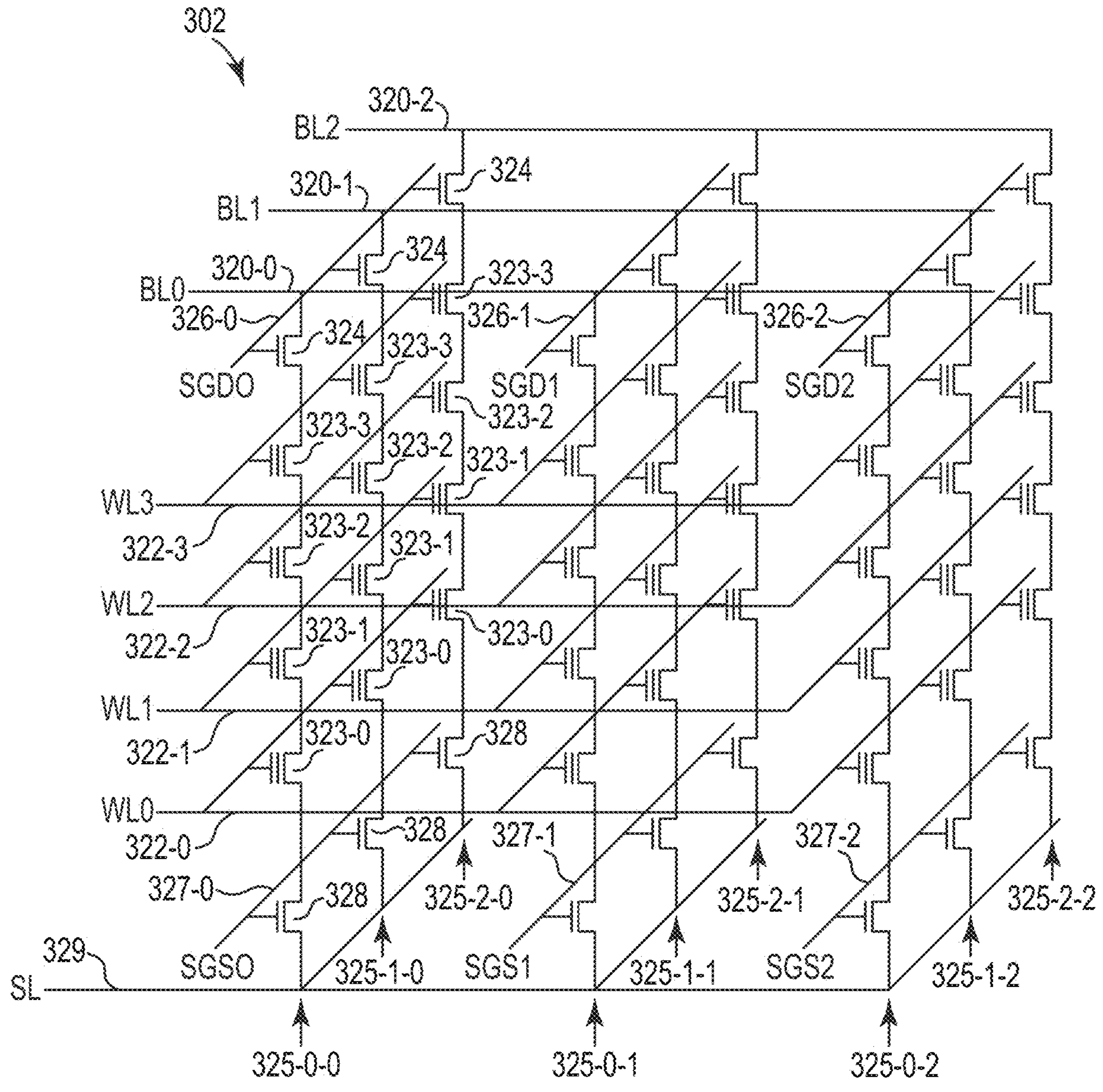
FIG. 3 is a schematic diagram illustrating an example memory array that can be operated in accordance with various embodiments of the present disclosure.

FIG. 3 is a schematic diagram illustrating an example memory array 302 in accordance with various embodiments of the present disclosure. The memory array 302 can be located in a memory device such as memory device 200 described in FIG. 2, for example. The memory array 302 is a 3D NAND array (e.g., RG NAND array or a floating gate NAND array).

The memory array 302 comprises a number of access lines (word lines) 322-0 (WL0), 322-1 (WL1), 322-2 (WL2), and 322-3 (WL3) and a number of sense lines (bit lines) 320-0 (BL0), 320-1 (BL1), and 320-2 (BL2) coupled to multiple strings 325-0-0, 325-0-1, 325-0-2, 325-1-0, 325-1-1, 325-1-2, 325-2-0, 325-2-1, and 325-2-2. The word lines, bit lines, and strings are collectively referred to as word lines 322, bit lines 320, and strings 325, respectively. Although four word lines 322, three bit lines 320, and nine strings 325 are shown, embodiments are not so limited.

Each of the strings 325 comprises a number of memory cells (referred to collectively as memory cells 323) located between a select transistor 324 and a select transistor 328. For example, as shown in FIG. 3, strings 325-0-0, 325-1-0, and 325-1-2 each respectively comprise memory cells 323-0, 323-2, 323-2, and 323-3 located between select transistors 324 and 328 (e.g., respective drain-side select gate (SGD) 324 and source-side select gate (SGS) 328). The memory cells 323 can be floating gate transistors or charge trap cells with the cells 323 of a given string 325 sharing a common channel region (e.g., pillar). As shown, the memory cells 323 of a given string are series-coupled source to drain between the SGD transistor 324 and the SGS.

The memory cells 323 of the strings 325 are stacked vertically such that they are located on distinct tiers/levels of the memory array 302. Each word line 322 can be commonly coupled to all the memory cells at a particular tier/level. For example, word line 322-0 can be coupled to (e.g., as the control gate) the nine memory cells 323-0 corresponding to the nine respective strings 325.

The select gate transistors 324 and 328 can be controlled (e.g., turned on/off) via the corresponding select gate signals SGD0, SGD1, SGD2, SGS0, SGS1, and SGS2 in order to couple the strings 325 to their respective bit lines 320 and a common source line (SL) 329 during memory operations (e.g., reads, writes, erases). As shown in FIG. 3, the select gate signals SGD0, SGD1, and SGD2 are provided (e.g., to the gates of transistors 324) via respective conductive lines 326-0, 326-1, and 326-3, and the select gate signals SGS0, SGS1, and SGS2 are provided (e.g., to the gates of transistors 328) via respective conductive lines 327-0, 327-1, and 327-2. Although the signals SGS0, SGS1, and SGS2 are shown on separate conductive lines 327, in some embodiments the conductive lines 327-0, 327-1, and 327-2 may be coupled via a common SGS line.

To perform memory operations on the array 302, particular voltages (e.g., bias voltages) can be applied to the word lines 322, bit lines 320, and source line 329. The particular voltages applied depends on the memory operation being performed, and different voltages may be applied to the word lines 322 during a particular memory operation in order to store data in a cell (or page of cells) or read data from a cell. For example, an erase operation to remove data from a selected group of memory cells (e.g., a selected erase block) can include applying a relatively high voltage (e.g., 20V) to the source line 329, the relatively high voltage (e.g., 20V) to unselected word lines (e.g., word lines coupled to cells of an erase block not being erased), and a relatively low voltage (e.g., 0V) to the selected word lines (e.g., the word lines coupled to the erase block being erased), which results in erasing of the cells of the selected erase block by removing charge from their charge storage nodes (e.g., charge-trap layers or floating gates) and thereby reducing their Vt levels to near 0V, for example. Additional example biasing schemes are described in more detail in association with FIG. 4.

Figure 4:
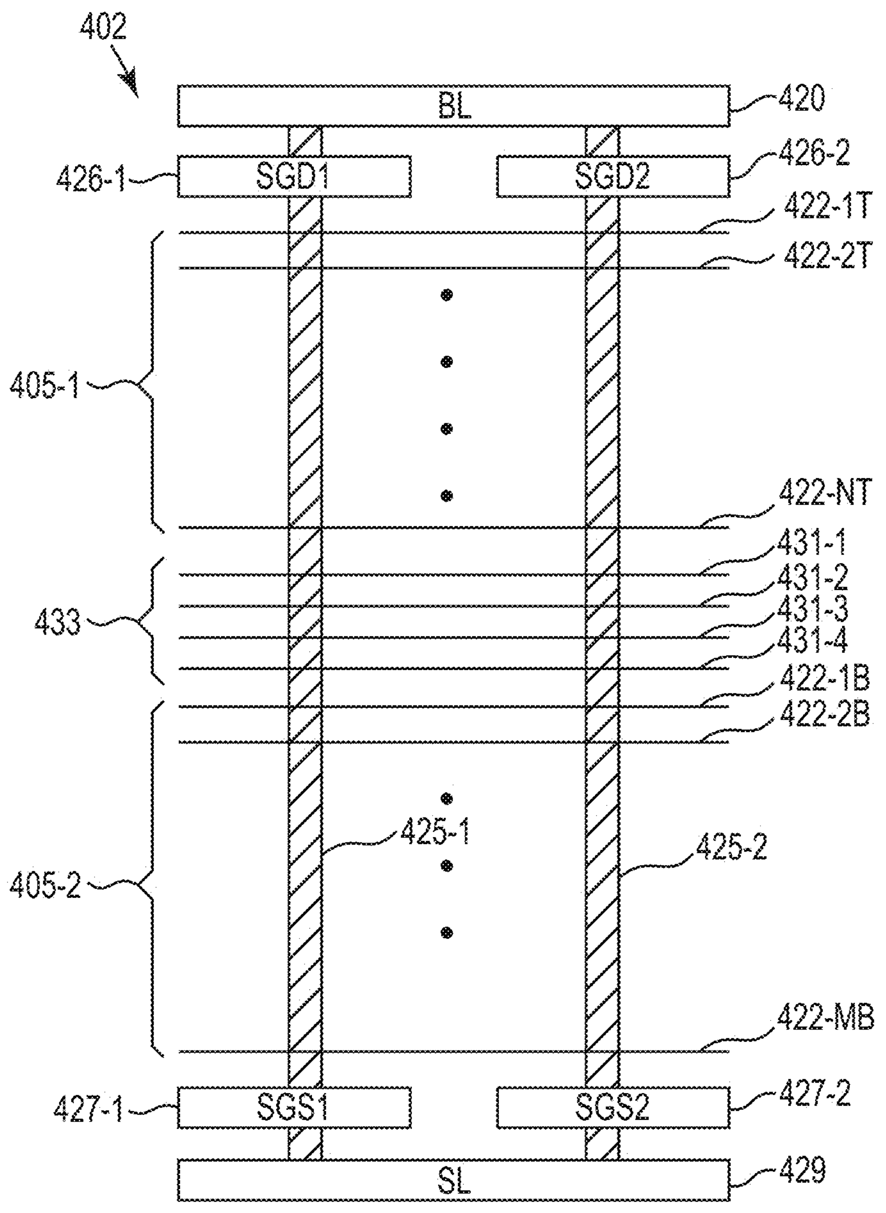
FIG. 4 schematically illustrates a portion of a memory array having multiple erase blocks per string and that can be operated in accordance with various embodiments of the present disclosure.

As described further in FIG. 4, the memory cells 323 of the array 302 can represent a physical block of memory cells that can comprise multiple (e.g., two or more) physical erase blocks. As an example, the word lines 322-0 and 322-1 can be coupled to cells of a first erase block, and the word lines 322-2 and 322-3 can be coupled to cells of a second/different erase block. Therefore, the cells 323-0 and 323-1 of the nine respective strings 325 (e.g., the cells of the first erase block) share respective common strings (e.g., common channel) with the cells 323-2 and 323-3 (e.g., the cells of the second erase block).

As further described herein, an array (e.g., 302) can comprise a number of word lines physically between (e.g., separating) the word lines (e.g., 322) corresponding to different erase blocks. The word lines separating word lines corresponding to different erase blocks can be referred to as "dummy" word lines and can be coupled to dummy memory cells (e.g., within the strings 325) that are not used to store data. The dummy word lines and/or dummy cells can facilitate the ability to perform erase operations separately on erase blocks that share a common string or strings. For example, one erase block within a physical block can be erased without erasing one or more other erase blocks within the physical block. The quantity of dummy word lines between erase blocks can vary, and various bias voltages can be applied to the dummy word lines during the various memory operations performed on the erase blocks.

In operation, erase blocks can be separately (e.g., individually) selected or deselected. For example, an erase operation can be performed on a selected first erase block corresponding to a group of strings while another erase block(s) corresponding to the same group of strings is deselected for the erase operation (e.g., such that is not erased). As described further herein, the ability to independently operate (e.g., write, read, erase) erase blocks within a physical block can result in disturb effects (e.g., Vt shifts)

among erase blocks, and such disturb effects can be exacerbated in instances in which particular erase blocks experience P/E cycling at a faster rate than other erase blocks within a physical block. Disturb effects can be mitigated, for example, by refreshing (e.g., rewriting) victim erase blocks. However, increased refreshes result in increased write amplification as the valid data in the victim erase block is moved to a free erase block, and the victim erase block is erased (e.g., as part of a garbage collection process). A P/E cycling offset can be monitored and used to determine when erase blocks are to be refreshed (e.g., in order to prevent data loss due to disturb effects). The P/E cycling offset can refer to a P/E cycle count value (e.g., 50, 100, 200, 500) corresponding to a P/E cycle differential between erase blocks within a particular physical block. Upon a first erase block being programmed, the P/E cycle count corresponding to a sibling erase block is incremented until the first block experiences a next P/E cycle, and if the P/E cycle count corresponding to the sibling block reaches the P/E cycling offset value before the first block experiences the next P/E cycle, then the first block is proactively refreshed.

FIG. 4 schematically illustrates a portion of a memory array 402 having multiple erase blocks per string that can be operated in accordance with various embodiments of the present disclosure. The example shown can be a portion of the array 302 described in FIG. 3. The array portion 402 can be a portion of a physical block of memory cells that includes multiple erase blocks (e.g., decks); although, embodiments of the present disclosure are not limited to arrays comprising multiple erase blocks per physical block.

In this example, the array 402 includes a plurality/group of word lines 422-1T, 422-2T, 422-NT corresponding to a first erase block 405-1 (e.g., a top deck) and a plurality/group of word lines 422-1B, 422-2B, . . . , 422-MB corresponding to a second erase block 405-2 (e.g., bottom deck). The designators "N" and "M" can represent various numbers (e.g., 3 or more) and "N" and "M" can be the same number. Accordingly, embodiments are not limited to a particular quantity of word lines 422 for the top deck 405-1 or bottom deck 405-2 (the designator "T" corresponding to "top" and the designator "B" corresponding to "bottom"). The array 402 also includes a number of dummy word lines 431-1, 431-2, 431-3, and 431-4, which can be collectively referred to as word lines 431. The dummy word lines 431 correspond to a separation region 433 between the top deck 405-1 and bottom deck 405-2. Although four word lines 431 are illustrated, embodiments can include more or fewer than four dummy word lines 431 separating erase blocks corresponding to same strings.

The array portion 402 illustrates two strings 425-1 and 425-2 for ease of illustration; however, embodiments can include many more strings 425. Memory cells are located at the intersections of the word lines 422/431 and strings 425, with the memory cells of a particular string 425 sharing a common channel region (e.g., pillar) as described in FIG. 3. The dummy word lines 431 can be coupled to dummy memory cells (e.g., cells that are not addressable to store user data).

As illustrated in FIG. 4, a first end of the strings 425-1 and 425-2 can be coupled to a common source line 429 via respective select gate source lines 427-1 (SGS1) and 427-2 (SGS2). The second/opposite end of the strings 425-1 and 425-2 can be coupled to a bit line 420 via respective select gate drain lines 426-1 (SGD1) and 426-2 (SGD2). As such, the strings 425 (e.g., the cells thereof) can be individually accessed using the bit line 420 and select gates to which the lines 426-1 and 426-2 are coupled. Although only a single bit line 420 is shown, embodiments can include multiple bit lines such as shown in FIG. 2, for example.

As noted herein, in various embodiments, the top deck 405-1 and the bottom deck 405-2 can be read, programmed, and/or erased via separate operations even though the cells of the decks 405-1/405-2 share the same strings 425-1/425-2. For example, each one of the decks 405-1 and 405-2 can be individually programmed and/or erased without programming or erasing the other of the decks 405-1 and 405-2.

Figure 5:
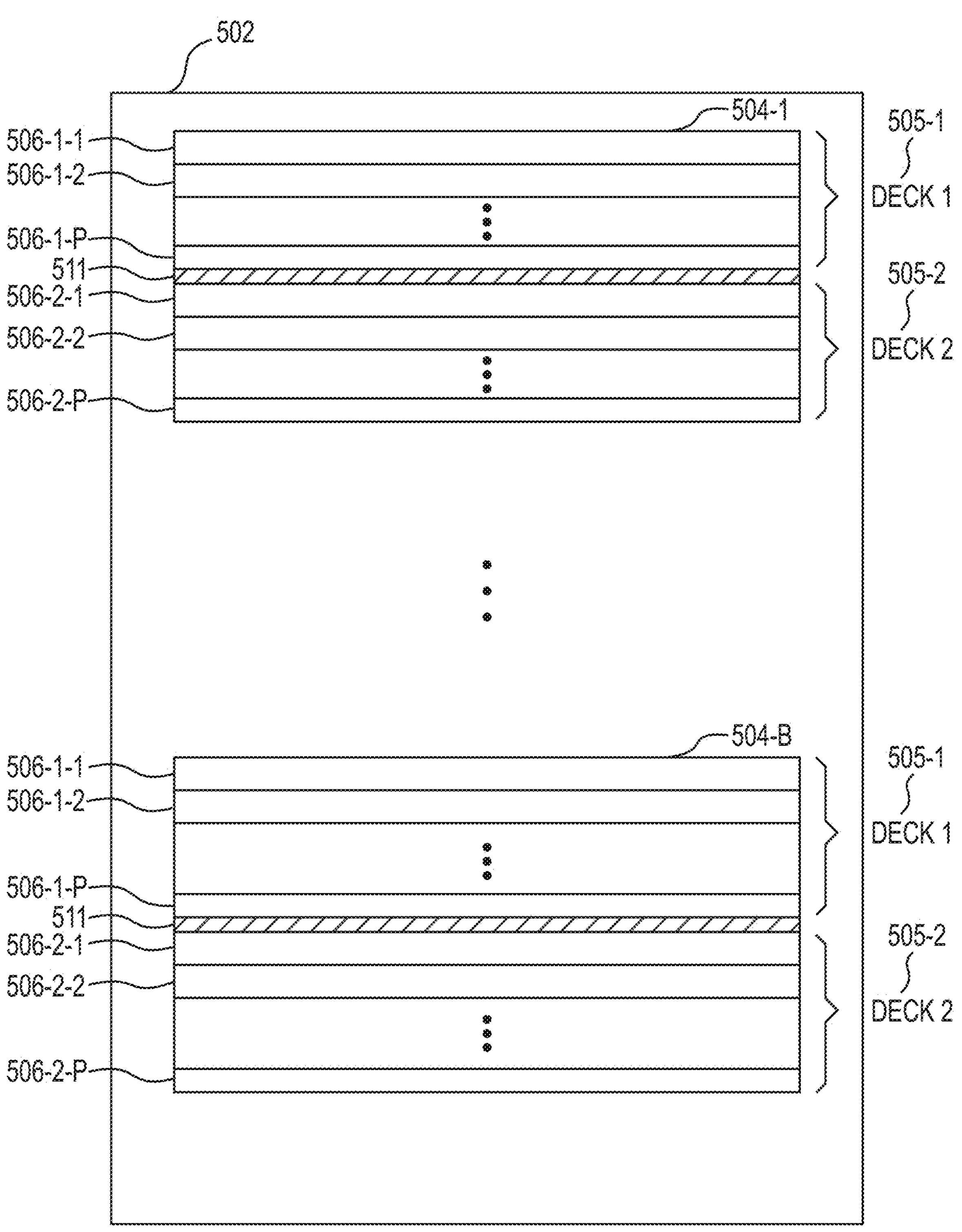
FIG. 5 illustrates a portion of a memory array having multiple erase blocks per string and that can be operated in accordance with various embodiments of the present disclosure.

FIG. 5 illustrates a portion of a memory array 502 having multiple erase blocks per string in accordance with various embodiments of the present disclosure. The memory array 502 includes multiple physical blocks 504-1, . . . , 504-B and can be operated in accordance with one or more embodiments of the present disclosure. The indicator "B" is used to indicate that the array 502 can include a number of physical blocks 504. As an example, the number of physical blocks in array 502 can be 128 blocks, 512 blocks, or 1,024 blocks, but embodiments are not limited to a particular multiple of 128 or to any particular number of physical blocks in an array 502. The memory array 502 can be, for example, a NAND flash memory array (e.g., a 3D NAND flash array such as array 102, 202, and/or 302).

Each of the physical blocks 504-1, . . . , 504-B includes a first erase block 505-1 (DECK_1) and a second erase block 505-2 (DECK_2) separated by a region 511, which can correspond to a region of dummy word lines such as word lines 431 shown in FIG. 4. As described above, the decks 505-1 and 505-2 are commonly coupled to the strings of the blocks 504-1, . . . , 504-B with the decks 505-1 and 505-2 being separately erasable via a block erase operation (e.g., deck 505-1 can be erased without erasing deck 505-2 and vice versa). Although the physical blocks 504 are shown as including two decks, embodiments are not so limited. For example, the physical blocks 504 can include more than two decks and in some embodiments different physical blocks 504 can include different quantities of decks.

Each deck 505-1 and 505-2 can comprise a number of physical pages, which can correspond to a "row" of the array corresponding to a particular word line. As shown, deck 505-1 comprises pages 506-1-1, 506-1-2, . . . , 506-1-P, and deck 505-2 comprises pages 506-2-1, 506-2-2, . . . , 506-2-P. The designator "P" is used to indicate that the decks 505-1 and 505-2 can comprise a plurality of pages/rows. Each physical page (collectively referred to as pages 506) can store multiple logical pages of data. A page can refer to a unit of programming and/or reading (e.g., a group of cells that are programmed and/or read together as a functional group).

As described herein, various embodiments can include tracking erase block cycling offsets on a per erase block basis (e.g., via component 193). The amount of valid data stored per erase block and per physical block can also be tracked (e.g., via component 198) and used in association with implementing a memory management policy that takes into account P/E cycle management and garbage collection in order to opportunistically provide improved QoS and/or write amplification.

Figure 6:
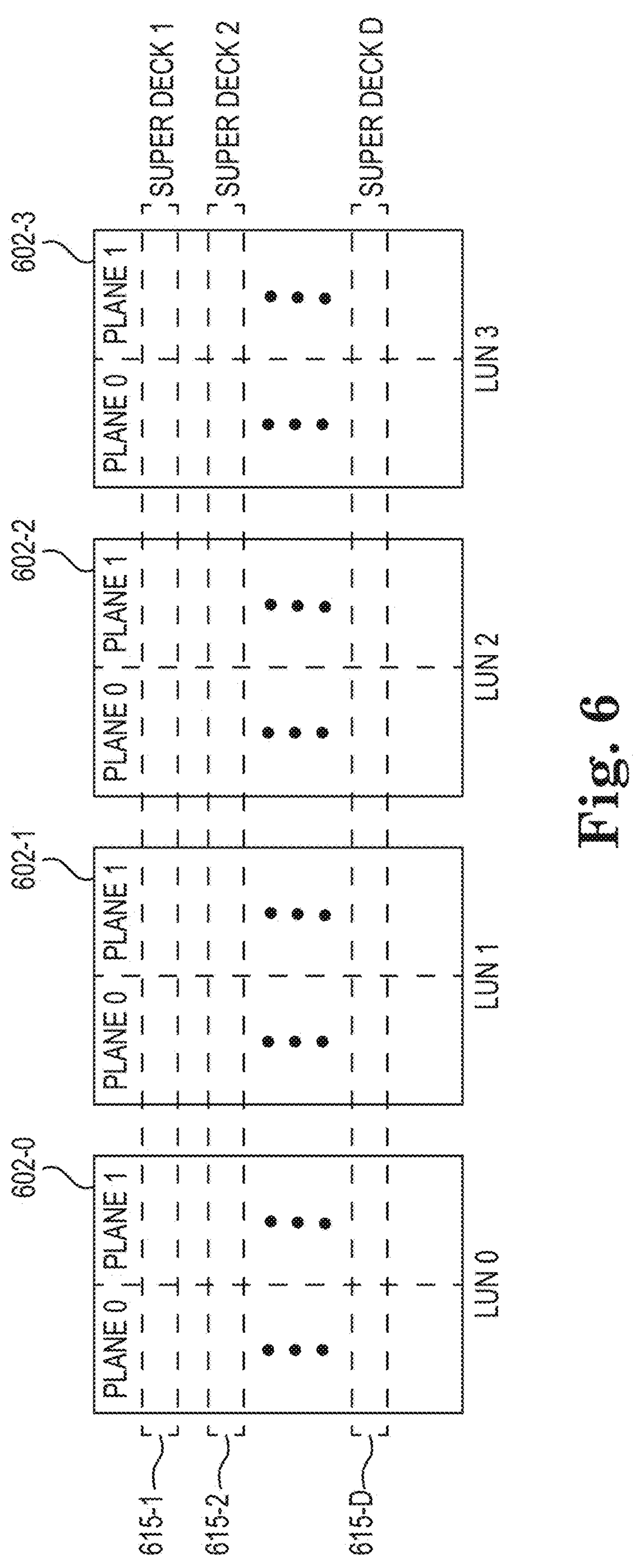
FIG. 6 illustrates a portion of a memory device having multiple erase blocks per string in accordance with various embodiments of the present disclosure.

FIG. 6 illustrates a portion of a memory device having multiple erase blocks in accordance with various embodiments of the present disclosure. In various embodiments, the physical blocks of a memory array can be organized into planes. For example, FIG. 6 illustrates memory arrays 602-0, 602-1, 602-2, and 602-3 each divided into a first plane (PLANE 0) of physical blocks and a second plane (PLANE 1) of physical blocks. Embodiments are not limited to a particular quantity of planes per array. Each array 602-0, 602-1, 602-2, and 602-3 corresponds to a respective logical unit (LUN) LUN0, LUN1, LUN2, and LUN3. Each LUN can correspond to a different memory device (e.g., memory device 100 shown in FIG. 1); however, embodiments are not so limited. For example, a memory device (e.g., die) can include multiple LUNs. A LUN can, for example, correspond to a smallest unit that can independently execute commands and report status.

The physical blocks of the planes can comprise multiple erase blocks sharing common strings as described herein. The physical blocks can be grouped into "super blocks" with each super block comprising a physical block from each plane (e.g., PLANE 0 and PLANE 1) across multiple LUNs (e.g., across multiple arrays 602). Similarly, embodiments of the present disclosure an include a number of super decks 615-1 (SUPER DECK_1), 615-2 (SUPER DECK_2), . . . , 615-D (SUPER DECK_D). Each super deck (or super erase block) 615 can comprise a deck from each plane across multiple LUNs. For example, a first super deck 615-1 (SUPER DECK_1) can comprise a deck from plane 0 of LUN0, a deck from plane 1 of LUN1, a deck from plane 0 of LUN1, a deck from plane 1 of LUN1, a deck from plane 0 of LUN2, a deck from plane 1 of LUN2, a deck from plane 0 of LUN3, and a deck from plane 1 of LUN3.

Embodiments of the present disclosure can monitor erase block cycling offset information on a super deck level as well as, or instead of, on a deck level. Similarly, the amount of valid data stored can also be tracked on a per super deck level and per super block level. For instance, consider an example in which the constituent decks of a super deck 615-1 share common strings with the respective constituent decks of a super deck 615-2 (e.g., super decks 615-1 and 615-2 are located in a same physical super block). The decks of super deck 615-1 can be erased together as a group.

FIG. 7 is a flow diagram illustrating memory management among multiple erase blocks coupled to a same string in accordance with various embodiments of the present disclosure. The method 770 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 770 is performed by the controller 191 of FIG. 1 and/or the control circuitry 210 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 772, the method includes tracking a program/erase (P/E) cycling offset for multiple erase blocks of a memory array comprising a plurality of physical blocks of strings of memory cells, wherein each physical block of the plurality of physical blocks comprises at least two multiple erase blocks that are independently erasable, and wherein the multiple erase blocks within a particular physical block comprise memory cells coupled to a same string corresponding to the particular physical block;

At 774, the method includes performing garbage collection on a per erase block basis. At 776, the method periodically switching to performing garbage collection on a per physical block basis instead of on a per erase block basis. A number of embodiments include switching to performing garbage collection on the per physical block basis instead of on the per erase block basis responsive to identifying a sequential workload. A number of embodiments include, after switching to performing garbage collection on the per physical block basis instead of on the per erase block basis, switching back to performing garbage collection on the per erase block basis. The switching back to performing garbage collection on the per erase block basis can be done, for example, responsive to a determined change in a quality of service. For instance, an initial switch from erase block level garbage collection to physical block level garbage collection can occur to achieve an improved QoS metric (e.g., improved latency due to reduced bus collisions), and the switch back from physical block level to erase block level garbage collection can occur based on a particular erase block P/E offset value and a physical block level valid data amount corresponding to the memory management policy.

As used herein, an "apparatus" can refer to various structural components. For example, the computing system 101 shown in FIG. 1 can be considered an apparatus. Alternatively, the host 192, the controller 191, and the memory device 100 might each separately be considered an apparatus.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 502 in FIG. 5. As will be appreciated, elements shown in the various embodiments herein can be added, exchanged, and/or eliminated so as to provide a number of additional embodiments of the present disclosure.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C). Additionally, the phrase "at least one of A and B" means one or more of (A) or one or more of (B), or one or more of (A) and one or more of (B) such that both one or more of (A) and one or more of (B) is not required.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:

a memory array comprising a plurality of physical blocks of strings of memory cells, wherein each physical block of the plurality of physical blocks comprises multiple erase blocks that are independently erasable, and wherein the multiple erase blocks within a particular physical block comprise memory cells coupled to a same string corresponding to the particular physical block; and a controller coupled to the memory array and configured to:

perform a memory management operation at an erase block level;

switch between performing the memory management operation at the erase block level and at a physical block level in accordance with a memory management policy that includes a particular frequency at which the memory management operation is performed at the physical block level;

wherein the particular frequency is a variable frequency, and wherein the variable frequency is a function of an erase block program/erase (P/E) cycling offset value associated with the memory array and of an amount of valid data per physical block.

2. The apparatus of claim 1, wherein the memory management operation is a garbage collection operation.

3. The apparatus of claim 1, wherein each physical block of the memory array comprises at least three erase blocks that are independently erasable.

4. The apparatus of claim 1, wherein the memory array comprises a three-dimensional replacement gate NAND array.

5. An apparatus, comprising:

a memory array comprising a plurality of physical blocks of strings of memory cells, wherein each physical block of the plurality of physical blocks comprises multiple erase blocks that are independently erasable, and wherein the multiple erase blocks within a particular physical block comprise memory cells coupled to a same string corresponding to the particular physical block; and a controller coupled to the memory array and configured to:

track a program/erase (P/E) cycling offset for the multiple erase blocks;

perform garbage collection on a per erase block basis;

determine an amount of valid data on a per physical block basis; and periodically switch to perform garbage collection on a per physical block basis instead of on a per erase block basis;

wherein a frequency at which the controller periodically switches to perform garbage collection on the per physical block basis is variable; and wherein the frequency is a function of the P/E cycling offset and of the determined amount of valid data on the per physical block basis.

6. The apparatus of claim 5, wherein at least one of the physical blocks includes a number of dummy word lines separating at least two multiple erase blocks within the at least one physical block.

7. A method, comprising:

tracking a program/erase (P/E) cycling offset for multiple erase blocks of a memory array comprising a plurality of physical blocks of strings of memory cells, wherein each physical block of the plurality of physical blocks comprises multiple erase blocks that are independently erasable, and wherein the multiple erase blocks within a particular physical block comprise memory cells coupled to a same string corresponding to the particular physical block;

performing garbage collection on a per erase block basis; and periodically switching to performing the garbage collection on the per physical block basis instead of on the per erase block basis, wherein a frequency at which the periodically switching occurs is a function of a P/E cycling offset of the multiple erase blocks and of a determined amount of valid data on a per physical block basis.

8. The method of claim 7, further comprising, after switching to performing garbage collection on the per physical block basis instead of on the per erase block basis, switching back to performing garbage collection on the per erase block basis.

* * * * *